United States Patent [19]

van der Voort

[11] 4,282,157

[45] Aug. 4, 1981

[54] PROCESS FOR THE PREPARATION OF POLYALKENYL-SUBSTITUTED SUCCINIC ANHYDRIDE

[75] Inventor: Henricus G. P. van der Voort, Amsterdam, Netherlands

[73] Assignee: Shell Oil Company, Houston, Tex.

[21] Appl. No.: 194,644

[22] Filed: Oct. 6, 1980

[30] Foreign Application Priority Data

Oct. 24, 1979 [GB] United Kingdom ............... 36863/79

[51] Int. Cl.$^3$ ........................................... C07D 307/20
[52] U.S. Cl. ........................ 260/346.74; 260/346.76; 525/285; 525/328; 564/144
[58] Field of Search ...................... 260/346.74, 346.76; 525/285

[56] References Cited

U.S. PATENT DOCUMENTS

| | | | |
|---|---|---|---|
| 3,912,764 | 10/1975 | Palmer | 260/346.74 |
| 3,953,475 | 4/1976 | Puskas et al. | 260/346.74 |
| 3,960,889 | 6/1976 | Cullen et al. | 260/326.5 |
| 4,000,162 | 12/1976 | Cullen et al. | 260/346.8 |
| 4,158,664 | 6/1979 | Selwitz | 260/346.74 |

*Primary Examiner*—Richard Raymond
*Attorney, Agent, or Firm*—Ronald R. Reper

[57] ABSTRACT

An improved process is disclosed for the preparation of polyalkenyl-substituted succinic anhydride comprising a final thermal treatment after removal of excess maleic anhydride from the reaction mixture, resulting in lowered chlorine content of the desired product.

5 Claims, No Drawings

PROCESS FOR THE PREPARATION OF POLYALKENYL-SUBSTITUTED SUCCINIC ANHYDRIDE

The invention relates to an improved process for the preparation of polyalkenyl-substituted succinic anhydride.

BACKGROUND OF THE INVENTION

It is known from UK Specification No. 1,543,039 to prepare polyisobutene-substituted succinic anhydride (PIB/MALA) by reacting a mixture of maleic anhydride and a polymer of isobutene with a molar deficiency of chlorine on maleic anhydride.

The mixture of polymer and maleic anhydride is suitably heated to the reaction temperature before it is contacted with the chlorine. The mixture is contacted with a molar deficiency of chlorine before a substantial amount, e.g. less than half, of the maleic anhydride has reacted. Suitably substantially none of the maleic anhydride has reacted. The rate of introduction of chlorine into the mixture may vary between wide limits but is preferably such that it equals the rate of chlorine uptake. Usually the chlorine is introduced over a period of from 0.5 to 10 hours, preferably of from 3 to 7 hours.

After the chlorination treatment it is advantageous to subject the resultant product mixture to a post-reaction or thermal treatment. This thermal treatment is suitably carried out at a temperature in the range from 140° to 220° C., preferably from 160° to 210° C. The conditions are usually such, that substantially no part of the product mixture is removed during this thermal treatment. The thermal treatment may be for from 0.1 to 20 hours but preferably from 0.5 to 10 hours. Longer periods tend to increase the formation of tarry by-products.

Using the above process a conversion of the polymer of isobutene (PIB, molecular weight 1029) of up to 90% is reached whereas the percentage of chlorine in the product is about 0.4%w. Comparing the above process with other art processed the most striking advantage of the first is that at reaction temperatures of about 200° C. higher polymer conversions to lower chlorine containing products are obtained. These prior art processes are described in e.g. published Netherlands Applications No. 7412057 and No. 7313404 and in UK Specification No. 949,981.

It is known, e.g. from published Netherlands Application No. 7412057, to prepare polyisobutene-substituted succinic anhydride by reacting thermally a polymer of isobutene with maleic anhydride. From published Netherlands Application No. 7313404 it is known to prepare similar products by reacting thermally the polymer of isobutene with maleic anhydride until substantially all (i.e. at least half) of the maleic anhydride has been consumed and thereafter continuing the reaction in the presence of chlorine.

One problem often encoutered with these processes, which involve a substantial amount of thermal reaction, is that fairly high temperatures, e.g. temperatures about 220° C., are required to achieve a satisfactory reaction rate and at such high temperatures an undesirable amount of tarry by-products are formed.

From UK Specification No. 949,981 it is known to prepare such products by containing a mixture of the polymer of isobutene and maleic anhydride with at least one mole of chlorine for each mole of maleic anhydride (one-stage chlorination route). Since such a process does not involve a substantial amount of thermal reaction it is possible to use a lower temperature e.g. a temperature of below 220° C. However, the final product contains a fairly high amount of chlorine.

It is known e.g. from U.S. Pat. Nos. 3,960,889 and 4,000,162 to prepare alkylenepolyamine derivatives of the reaction product of a dehydrohalogenated polyalkene and maleic anhydride, which derivatives are useful detergent-dispersants in lubricating oil.

It has now surprisingly been found that at high PIB-conversion levels (up to 90%) the chlorine percentage in the product obtained from a similar process as that described in UK Specification No. 1,543,039 can further be decreased to less than 0.2%w if the PIB/MALA Product is subjected to a thermal treatment after excess MALA Has been stripped off.

SUMMARY OF THE INVENTION

Accordingly the present invention relates to a process for the preparation of polyalkenyl-substituted succinic anhydride comprising preparing a mixture of an alkene polymer and maleic anhydride, contacting the mixture with chlorine at elevated temperature, and removing excess maleic anhydride, characterized in that after removing excess maleic anhydride the formed polyakenyl succinic anhydride is subjected to a thermal treatment.

DESCRIPTION OF PREFERRED EMBODIMENTS

Suitably the thermal treatment is carried out at a temperature of from 140°–230° C. Preferably the temperature range is from 185–210° C. The thermal treatment is suitably carried out for from 0.1–30 hours, preferably from 3–6 hours. The pressure at which the thermal treatment is carried out is suitably of from 10–200 mbar.

Suitably polyolefins for the polyalkenyl succinic anhydride include polyethylene, polypropylene, polybutenes or mixtures of polybutenes etc. of which polyisobutene is preferred, because of its availability and effectiveness in the products derived from it. The average molecular weight of the polyalkenyl group is preferably of from 300–200,000.

The products of the present invention are particularly suitable for the preparation of ashless dispersants for oils such as lubricating oils. These dispersants are prepared by reacting the products, or the hydrolysis products thereof, with polar compounds, such as polyalcohols, e.g. pentaerythritol or tris(hydroxymethyl-amino)methane, and/or polyamines, e.g. polyalkylene amines such as tetraethylene pentamine.

It has been found that when the present product is reacted with polyamines e.g. with tetraethylene pentamine the problem of a large amount of insoluble material formed by the reaction of the polyamines with HCl and which has to be removed by filtration is substantially solved. This problems appears to exist when higher chlorine percentage products are used such as the product prepared by the former mentioned process according to UK Specification No. 1,543,039.

The invention therefore also related to a process wherein the polyakenyl succinic acid is reacted with a polyamine. Preferably tetraethylene pentamine is used.

The invention will now be described by reference to the following examples.

EXAMPLE I

A mixture of 660 pbw of a polymer is isobutene (PIB, molecular weight 960) and 109 pbw of maleic anhydride (MALA, molar ratio MALA to PIB 1.7:1) was heated to 180° C. and purged with nitrogen. Chlorine (52.5 pbw, molar ratio of chlorine to MALA 0.67:1) was introduced below the surface of the mixture during a period of 5 hours. The mixture was then heated at 180° C. for 4 hours. Then excess MALA was removed. The PIB conversion was 83% while the acid number of the crude product was 1.86 meq/g.

The PIB/MALA product containing 0.41%w chlorine was subjected to a thermal treatment at 210° C. in a nitrogen stream.

The dehydrochlorination of PIB/MALA was followed by determining the chlorine content at various points of time as represented in the next table.

TABLE I

Dehydrochlorination of PIB/MALA at 210° C. in a nitrogenstream

| Time, h | Cl, % w |
|---|---|
| 0 | 0.41 |
| 1 | 0.30 |
| 2 | 0.26 |
| 5 | 0.21 |
| 6 | 0.21 |
| 8 | 0.20 |
| 24 | 0.18 |

EXAMPLE II

After 24 hours of thermal treatment at 185° C. under $N_2$ the PIB/MALA Product contained 0.26%w chlorine. This product was reacted with tetra ethylene pentamine (TEPA) in a ratio of 188 gram TEPA/1000 g PIB/MALA and the deposit calculated on intake of TEPA.

For a comparison the untreated PIB/MALA product, containing 0.41%w chlorine, was also reacted with TEPA in the same ratio and the deposit was calculated. Table II shows the results of this experiment.

TABLE II

|  | g TEPA 1000 g PIB/MALA | Deposit, % w calc. on intake TEPA |
|---|---|---|
| PIB/MALA (0.41 % w Cl$_2$) untreated | 188 | 6.4 |
| PIB/MALA (0.26 % w Cl$_2$) treated | 188 | 1.5 |

As can be seen from the figures in Table II the deposit in case of treated PIB/MALA is surprisingly about four times less than the deposit in case of untreated PIB/MALA, whereas the chlorine content is about two times less than the chlorine content of the untreated PIB/MALA. One should expect in view of the ratio in chlorine contents between the treated and untreated PIB/MALA that the treated PIB/MALA should show a deposit of about two times less than that of the treated PIB/MALA.

What is claimed is:

1. In a process for the preparation of polyalkenyl-substituted succinic anhydride which comprises preparing a mixture of an alkene polymer and maleic anhydride, contacting the mixture with chlorine at elevated temperature followed by a post-reaction and then removing excess maleic anhydride, the improvement which comprises after removing excess maleic anhydride, subjecting the formed polyalkenyl succinic anhydride to a thermal treatment at a temperature of from 140°–230° C. for a period of 0.1 to 30 hours.

2. A process as in claim 1 wherein the thermal treatment is carried out at a temperature of from 185°–210° C.

3. A process as in claim 1 wherein the thermal treatment is carried out for from 3–6 hours.

4. A process as in claim 1 wherein the thermal treatment is carried out at a pressure of from 10–200 mbar.

5. A process as in claim 1 wherein the polyalkenyl succinic anhydride is a polyisobutenyl succinic anhydride, of which the polyisobutenyl group has an average molecular weight of from 300–200,000.

* * * * *